(12) United States Patent
Hsu et al.

(10) Patent No.: US 11,289,863 B2
(45) Date of Patent: Mar. 29, 2022

(54) SMART ADAPTER

(71) Applicant: Cheng Uei Precision Industry Co., LTD., New Taipei (TW)

(72) Inventors: Wen-Bing Hsu, New Taipei (TW); Chin-Huang Tseng, New Taipei (TW); Hui-Lin Lai, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/214,551

(22) Filed: Mar. 26, 2021

(65) Prior Publication Data

US 2021/0359480 A1    Nov. 18, 2021

(30) Foreign Application Priority Data

May 13, 2020  (CN) .......................... 202020795907.2

(51) Int. Cl.
| | | |
|---|---|---|
| *H01R 11/00* | (2006.01) | |
| *H01R 31/06* | (2006.01) | |
| *H01R 13/717* | (2006.01) | |
| *H01R 13/70* | (2006.01) | |
| *H01R 13/66* | (2006.01) | |

(52) U.S. Cl.
CPC ....... *H01R 31/065* (2013.01); *H01R 13/6666* (2013.01); *H01R 13/6675* (2013.01); *H01R 13/701* (2013.01); *H01R 13/717* (2013.01)

(58) Field of Classification Search
CPC ...... H01R 31/06; H01R 25/003; H01R 33/94; H01R 25/006; H01R 31/02; H01R 9/2458

USPC ........................................................ 439/502
See application file for complete search history.

(56) References Cited

U.S. PATENT DOCUMENTS

| | | | | | |
|---|---|---|---|---|---|
| 6,045,399 | A | * | 4/2000 | Yu ........................ | H01R 25/003 439/214 |
| 6,302,743 | B1 | * | 10/2001 | Chiu .................... | H01R 25/003 439/22 |
| 6,780,048 | B2 | * | 8/2004 | Chen .................. | H01R 13/7034 439/502 |
| 6,940,015 | B2 | * | 9/2005 | Fang .................... | H01R 13/465 174/50 |
| 7,497,740 | B2 | * | 3/2009 | Mei ...................... | H01R 13/514 200/51 R |
| 7,575,470 | B2 | * | 8/2009 | Pyrros .................. | H01R 13/514 439/535 |

* cited by examiner

*Primary Examiner* — Phuong Chi Thi Nguyen
(74) *Attorney, Agent, or Firm* — Cheng-Ju Chiang

(57) ABSTRACT

A smart adapter includes an insulating body, a plug fastened to the insulating body, at least one socket, at least one seven-segment displayer, at least one button and a main control unit. The at least one socket is mounted in the insulating body and is exposed to a front surface of the insulating body. The at least one seven-segment displayer is mounted in the insulating body. The at least one button is mounted in the insulating body and is exposed to the insulating body. The main control unit is mounted in the insulating body and is connected with the at least one socket, the plug and the at least one seven-segment displayer. The main control unit includes a cloud unit and a central processing unit. The cloud unit is connected to the at least one button and the central processing unit.

18 Claims, 6 Drawing Sheets

SMART ADAPTER

CROSS-REFERENCE TO RELATED APPLICATION

This application claims the priority of China patent application No. 202020795907.2, filed on May 13, 2020, which is incorporated herewith by reference.

BACKGROUND OF THE INVENTION

1. Field of the Invention

The present invention generally relates to a smart adapter, and more particularly to a smart adapter with display and network functions.

2. The Related Art

With the advancement of sciences and technologies, home appliances are widely used by users, and the home appliances are gradually matched with smart adapters with display and network connection functions, so that the users can know electricity consumption information of the home appliances.

However, because a liquid crystal display (LCD) mounted on the smart adapter is expensive, if a light-emitting diode (LED) is used as a display, the LED can only display levels, and the LED has no way of displaying numbers, the user encounters problems of a price or insufficient display information of the smart adapter.

Therefore, it is necessary to provide an innovative smart adapter that is able to display more accurate information, such as the numbers, and a price of the innovative smart adapter is cheaper than a price of a liquid crystal display (LCD), so that a consumer can choose and use the innovative smart adapter in life.

SUMMARY OF THE INVENTION

An object of the present invention is to provide a smart adapter. The smart adapter includes an insulating body, a plug fastened to the insulating body, at least one socket, at least one seven-segment displayer, at least one button and a main control unit. The plug is partially exposed out of the insulating body. The plug includes at least one pin exposed beyond a rear surface of the insulating body. The at least one socket is mounted in the insulating body and is exposed to a front surface of the insulating body. The at least one seven-segment displayer is mounted in the insulating body and is exposed to the insulating body. The at least one button is mounted in the insulating body and is exposed to the insulating body. The main control unit is mounted in the insulating body and is connected with the at least one socket, the plug and the at least one seven-segment displayer. The main control unit includes a cloud unit and a central processing unit. The cloud unit is connected to the at least one button and the central processing unit. The cloud unit is able to be connected with an external internet-enabled device by virtue of a wireless fidelity technology to proceed with a data transmission between the cloud unit and the internet-enabled device within a wireless transmission distance. The central processing unit is connected with the at least one seven-segment displayer and the cloud unit. The central processing unit, the seven-segment displayer and the cloud unit are able to proceed with a data transmission to control a display content of the seven-segment displayer, and to communicate with and to control the external internet-enabled device so as to control the main control unit and an output status of the at least one socket.

Another object of the present invention is to provide a smart adapter. The smart adapter includes an insulating body, a plug fastened to the insulating body, at least one socket, at least one display unit, at least one button and a main control unit. The plug includes at least one pin exposed beyond a rear surface of the insulating body. The at least one socket is mounted in the insulating body and is exposed to a front surface of the insulating body. The at least one display unit is mounted in the insulating body and is exposed to the insulating body. The at least one button is mounted in the insulating body and is exposed to the insulating body. The main control unit is mounted in the insulating body, and is connected with the at least one socket, the plug and the at least one display unit. The main control unit includes a cloud unit and a central processing unit. The cloud unit is connected to the at least one button and the central processing unit. The cloud unit is able to be connected with an external internet-enabled device. The central processing unit is connected with the at least one display unit and the cloud unit. The central processing unit, the at least one display unit and the cloud unit are able to proceed with a data transmission to control a display content of the at least one display unit, and to communicate with and to control the external internet-enabled device so as to control the main control unit and an output status of each socket. Different functions of the smart adapter are realized by virtue of pressing the at least one button in different ways.

Another object of the present invention is to provide a smart adapter adapted for being connected with an external internet-enabled device. The smart adapter includes an insulating body, a plug fastened to the insulating body, at least one socket, at least one seven-segment displayer, at least one button and a main control unit. The plug includes at least one pin exposed beyond a rear surface of the insulating body. The at least one socket is mounted in the insulating body and is exposed to a front surface of the insulating body. The at least one seven-segment displayer is mounted in the insulating body and is exposed to the insulating body. The at least one button is mounted in the insulating body and is exposed to the insulating body. Displaying functions of the at least one seven-segment displayer are switched by virtue of pressing the at least one button for a shorter time and pressing different times of the at least one button, and a power-on function, a power-off function and a pairing function of the smart adapter are realized by virtue of pressing the at least one button for a longer time. The main control unit is mounted in the insulating body and is connected with the at least one socket, the plug and the at least one seven-segment displayer. The main control unit includes a cloud unit and a central processing unit. The cloud unit is connected to the at least one button and the central processing unit. The cloud unit is able to be connected with the external internet-enabled device by virtue of a wireless fidelity technology. The central processing unit is connected with the seven-segment displayer and the cloud unit. The central processing unit, the seven-segment displayer and the cloud unit are able to proceed with a data transmission to control a display content of the seven-segment displayer, and to communicate with and to control the external internet-enabled device so as to control the main control unit and an output status of each socket.

As described above, the smart adapter is equipped with the at least one display unit which is the at least one seven-segment displayer, so that the smart adapter can directly display usage statuses, and the smart adapter and the internet-enabled device can proceed with remote controls to achieve more functions.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
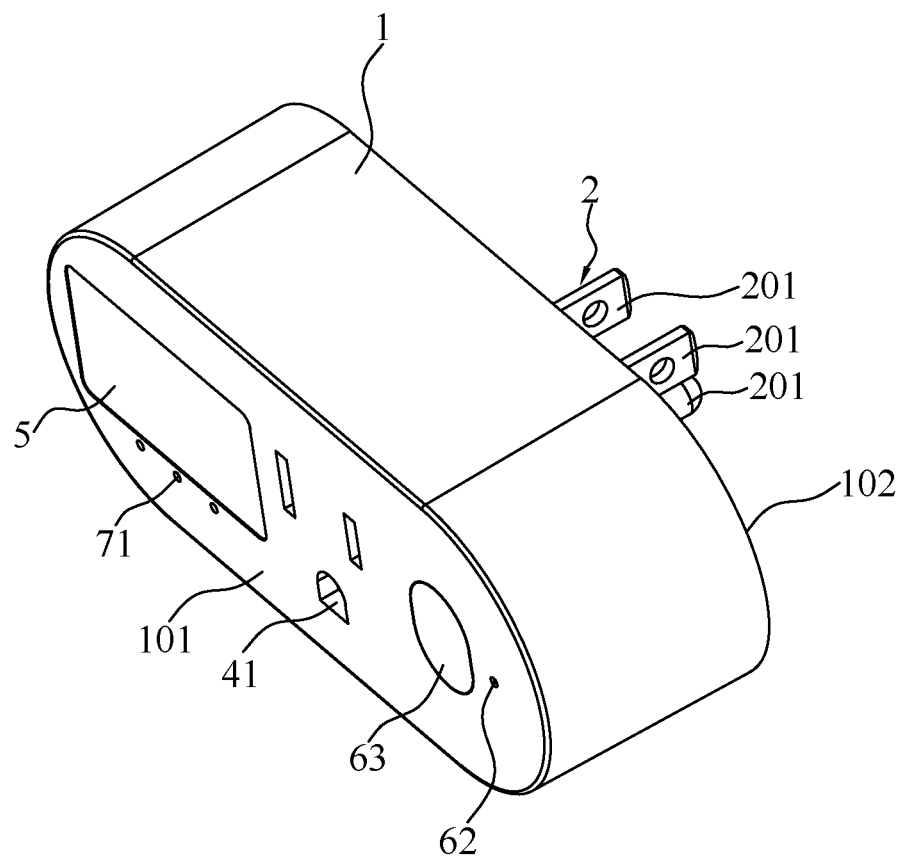
FIG. 1 is a perspective view of a smart adapter in accordance with a preferred embodiment of the present invention.
Figure 2:
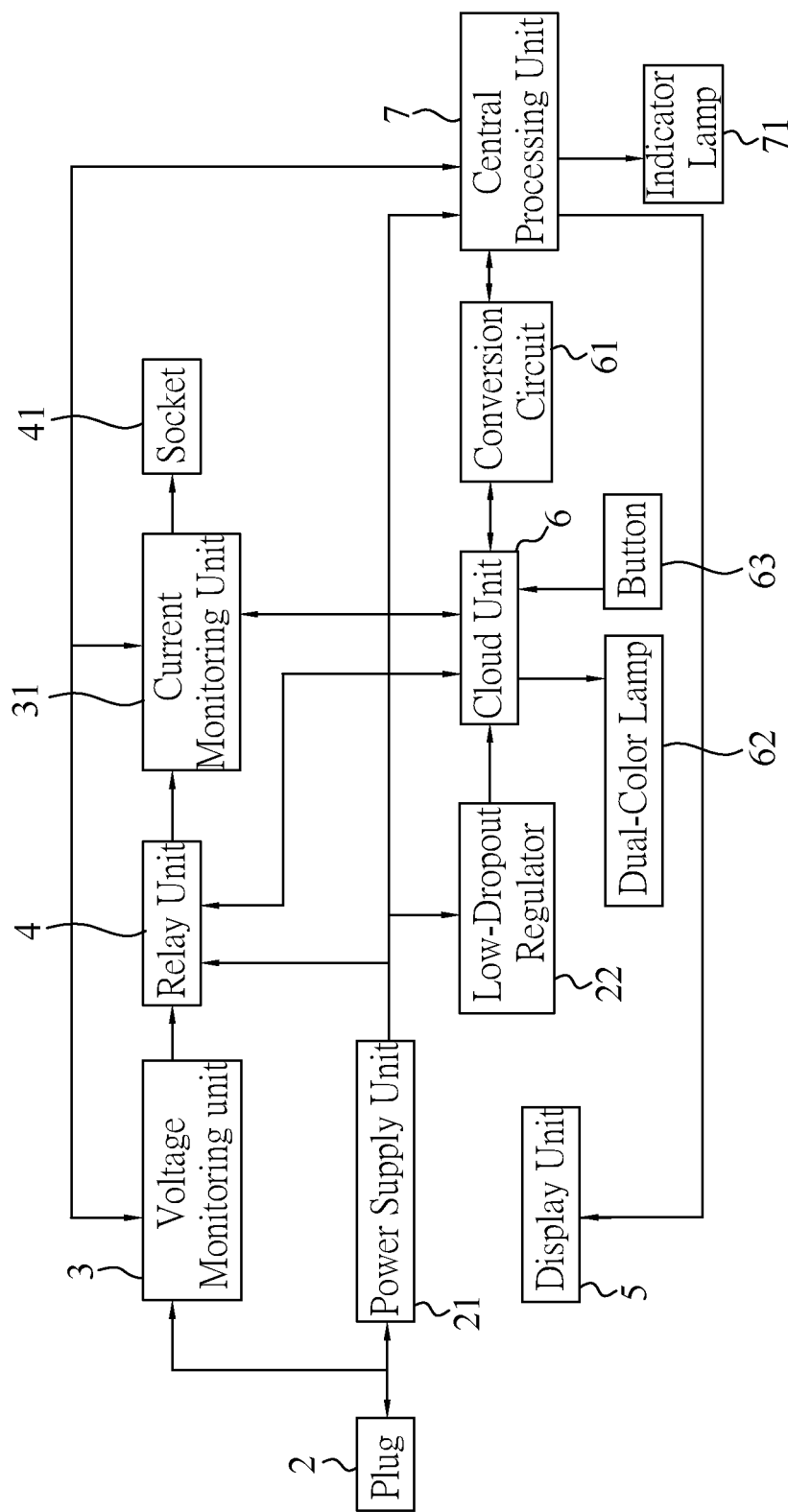
FIG. 2 is a block diagram of the smart adapter in accordance with the preferred embodiment of the present invention.
Figure 3:
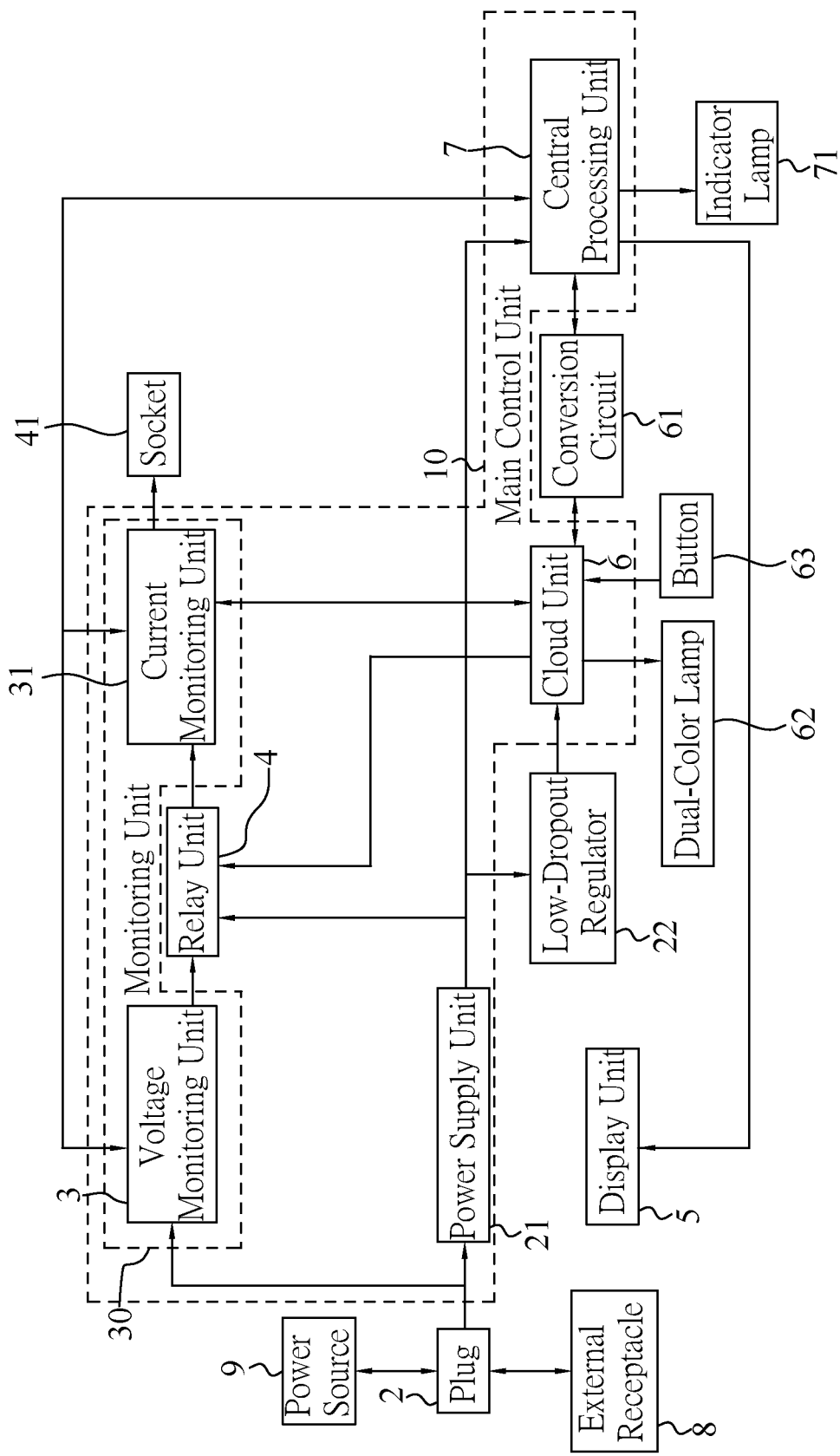
FIG. 3 is another block diagram of the smart adapter in accordance with the preferred embodiment of the present invention.
Figure 4:
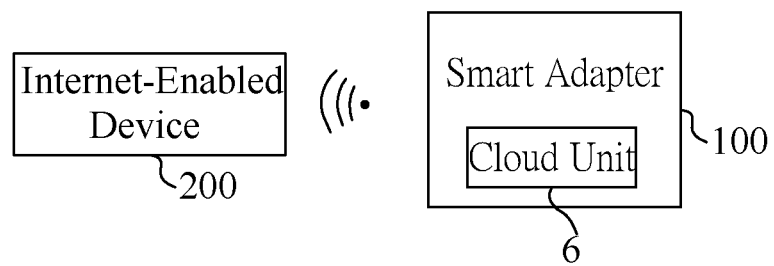
FIG. 4 is a block diagram showing that an internet-enabled device is wirelessly connected with the smart adapter in accordance with the preferred embodiment of the present invention.

With reference to FIG. 1 to FIG. 4, a smart adapter 100 in accordance with a preferred embodiment of the present invention is shown. The smart adapter 100 is adapted for being connected with an external internet-enabled device 200. The smart adapter 100 includes an insulating body 1, a plug 2, at least one display unit 5, at least one button 63 and a main control unit 10. The plug 2, the at least one display unit 5, the at least one button 63 and the main control unit 10 are mounted to the insulating body 1. The main control unit 10 includes a monitoring unit 30, a cloud unit 6 and a central processing unit 7. The main control unit 10 further includes a relay unit 4 and a power supply unit 21. The monitoring unit 30 includes a voltage monitoring unit 3 and a current monitoring unit 31. The smart adapter 100 has at least one socket 41 mounted in the insulating body 1 and exposed to a middle of a front surface 101 of the insulating body 1. The main control unit 10 is mounted in the insulating body 1, and is connected with the at least one socket 41, the plug 2 and the at least one display unit 5. In the preferred embodiment, the insulating body 1 has three sockets 41.

The plug 2 is fastened to the insulating body 1, and the plug 2 is partially exposed out of the insulating body 1. The plug 2 includes at least one pin 201 exposed beyond a rear surface 102 of the insulating body 1. The plug 2 is able to be a two-pin type plug or a three-pin type plug. In the preferred embodiment, the plug 2 includes three pins 201, so the plug 2 is the three-pin type plug. The plug 2 is used for being connected with an external receptacle 8 for guiding external currents into the smart adapter 100.

Specifically, the plug 2 is connected to the voltage monitoring unit 3. The power supply unit 21 is connected to the plug 2, the relay unit 4 and the central processing unit 7, and the power supply unit 21 is used to provide electricity for the main control unit 10. The power supply unit 21 is connected to the cloud unit 6 by the relay unit 4 and the current monitoring unit 31. The power supply unit 21 supplies the electricity to the relay unit 4 and the central processing unit 7. The smart adapter 100 further includes a low-dropout voltage regulator 22 connected between the power supply unit 21 and the cloud unit 6. The power supply unit 21 is additionally connected to the low-dropout voltage regulator 22. The low-dropout voltage regulator 22 is connected to the cloud unit 6, and the low-dropout voltage regulator 22 is used to provide weaker electricity for the cloud unit 6. The low-dropout voltage regulator 22 provides a lower voltage for the cloud unit 6. The plug 2 provides the electricity for the voltage monitoring unit 3 and the power supply unit 21, and the electricity received by the voltage monitoring unit 3 and the power supply unit 21 is stable. The power supply unit 21 provides 5V direct-current (DC) voltage electricity for the relay unit 4, the central processing unit 7 and the low-dropout voltage regulator 22. The low-dropout voltage regulator 22 provides 3.3V direct-current (DC) voltage electricity for the cloud unit 6.

The voltage monitoring unit 3 is connected to the plug 2, the current monitoring unit 31, the relay unit 4 and the central processing unit 7. The voltage monitoring unit 3 is an AC (Alternating Current) current sensor module which is an analog type. The voltage monitoring unit 3 and the current monitoring unit 31 are used to stabilize states of voltage and current in the main control unit 10. After the voltage monitoring unit 3 and the current monitoring unit 31 receive the electricity supplied from the plug 2, the stable electricity is provided for the relay unit 4 and the central processing unit 7, the stable electricity provided by the plug 2 and received by the voltage monitoring unit 3 and the current monitoring unit 31 is used for stabilizing voltage and current states of the relay unit 4 and the central processing unit 7. The voltage monitoring unit 3 and the current monitoring unit 31 are able to make a voltage value of the relay unit 4 and the central processing unit 7 maintained between a voltage value of alternating voltage (AC) 110V and a voltage value of alternating voltage (AC) 220V, and make a power dissipation of the relay unit 4 and the central processing unit 7 maintained between a power dissipation of the alternating voltage (AC) 110V and a power dissipation of the alternating voltage (AC) 220V. Specifically, the at least one display unit 5 is connected with the central processing unit 7. After the voltage monitoring unit 3 and the current monitoring unit 31 receive the electricity supplied from the plug 2, the stable electricity is provided for the relay unit 4, the at least one display unit 5 and the central processing unit 7, the stable electricity provided by the plug 2 and received by the voltage monitoring unit 3 and the current monitoring unit 31 is used for stabilizing voltage and current states of the relay unit 4, the at least one display unit 5 and the central processing unit 7. The voltage monitoring unit 3 and the current monitoring unit 31 are able to make a voltage value of the relay unit 4, the at least one display unit 5 and the central processing unit 7 maintained between the voltage value of alternating voltage (AC) 110V and the voltage value of alternating voltage (AC) 220V, and make a power dissipation of the relay unit 4, the at least one display unit 5 and the central processing unit 7 maintained between the power dissipation of the alternating voltage (AC) 110V and the power dissipation of the alternating voltage (AC) 220V.

The relay unit 4 is connected to the power supply unit 21, the voltage monitoring unit 3 and the cloud unit 6. The relay unit 4 serves as a signal adjustment unit among the power supply unit 21, the voltage monitoring unit 3 and the cloud unit 6. The relay unit 4 has an adjustment function of stabilizing signals among the power supply unit 21, the voltage monitoring unit 3 and the cloud unit 6. Specifically, in one situation, the relay unit 4 is able to receive, adjust and amplify control signals from the power supply unit 21, the voltage monitoring unit 3 and the cloud unit 6, and transmit the control signals of the power supply unit 21, the voltage monitoring unit 3 and the cloud unit 6 to the current monitoring unit 31 through the relay unit 4, so that a control signal attenuation problem is improved, and the power supply unit 21, the voltage monitoring unit 3 and the cloud unit 6 are able to proceed with a stable control signal transmission. In another situation, the relay unit 4 is able to receive, adjust and amplify the signals among the power supply unit 21, the voltage monitoring unit 3 and the cloud unit 6 bidirectionally, and the signals are transmitted among the power supply unit 21, the voltage monitoring unit 3 and the cloud unit 6 through the relay unit 4, so that a signal attenuation problem is improved, and the power supply unit 21, the voltage monitoring unit 3 and the cloud unit 6 are able to proceed with the stable signal transmission. The at least one socket 41 is disposed in the insulating body 1 and is exposed out of the insulating body 1. The at least one socket 41 is able to be connected with at least one insertion element of other electrical products (not shown), so that other electrical products are able to be applicably combined with the smart adapter 100 in accordance with the present invention. The at least one socket 41 is able to be a two-pin type socket or a three-pin type socket. The insulating body 1 is equipped with the plug 2, the at least one display unit 5, the at least one button 63 and the main control unit 10. Preferably, the at least one socket 41 is the three-pin type socket.

The at least one display unit 5 is connected to the central processing unit 7. The at least one display unit 5 receives the electricity and signals provided from the central processing unit 7 to display instructions which are provided from the central processing unit 7 on the at least one display unit 5. The at least one display unit 5 is at least one displayer which is at least one seven-segment displayer. Specifically, the at least one display unit 5 is the at least one seven-segment displayer. The central processing unit 7 is connected with the at least one seven-segment displayer, and the central processing unit 7 is connected with the cloud unit 6 via the conversion circuit 61. Furthermore, the at least one seven-segment displayer is able to display a four-digit number. The at least one display unit 5 which is the at least one seven-segment displayer is mounted in the insulating body 1 and is exposed to one side of the front surface 101 of the insulating body 1. The main control unit 10 is mounted in the insulating body 1, and is connected with the at least one socket 41, the plug 2 and the at least one seven-segment displayer. The central processing unit 7 is connected with the at least one display unit 5 and the cloud unit 6. The central processing unit 7 is connected with the seven-segment displayer and the cloud unit 6.

The cloud unit 6 is connected to the relay unit 4, the low-dropout voltage regulator 22, the current monitoring unit 31 and the central processing unit 7. The cloud unit 6 receives the electricity provided from the low-dropout voltage regulator 22 and is monitored by the current monitoring unit 31. The cloud unit 6 is able to be connected with the external internet-enabled device 200 in the same network domain, so that the smart adapter 100 is able to be cooperated with an application program in the internet-enabled device 200. The cloud unit 6 of the smart adapter 100 is able to be wirelessly connected with the external internet-enabled device 200 by virtue of a wireless fidelity (Wi-Fi) technology to proceed with a data transmission between the cloud unit 6 and the internet-enabled device 200 within a wireless transmission distance. The smart adapter 100 is wirelessly connected with the external internet-enabled device 200. The cloud unit 6 is a micro-controller. The central processing unit 7, the at least one display unit 5 which is the seven-segment displayer, and the cloud unit 6 are able to proceed with a data transmission to control a display content of the at least one display unit 5 which is the seven-segment displayer, and to communicate with and to control the external internet-enabled device 200 so as to control the main control unit 10 and an output status of the at least one socket 41. Preferably, the central processing unit 7, the at least one display unit 5 and the cloud unit 6 are able to proceed with the data transmission to control the display content of the at least one display unit 5 which is the seven-segment displayer, and to communicate with and to control the external internet-enabled device 200 so as to control the main control unit 10 and an output status of each socket 41.

The smart adapter 100 further includes a conversion circuit 61, a dual-color lamp 62 and the at least one button 63. The at least one button 63 is mounted in the insulating body 1 and is exposed to the other side of the front surface 101 of the insulating body 1. The at least one socket 41 is located between the at least one button 63 and the at least one display unit 5. The dual-color lamp 62 is a light-emitting diode (LED). The cloud unit 6 is connected to the at least one button 63, and the cloud unit 6 is connected to the central processing unit 7 through the conversion circuit 61. Specifically, the conversion circuit 61 is an inter-integrated circuit (I2C), and the conversion circuit 61 is a bidirectional signal level shift conversion circuit for a bidirectional conversion and a bidirectional transmission between a signal in the cloud unit 6 and a signal in the central processing unit 7. The cloud unit 6 is connected to the dual-color lamp 62. The dual-color lamp 62 has dual colors of red and blue to show whether the cloud unit 6 of the smart adapter 100 and the internet-enabled device 200 are in a mutual connection state. When the smart adapter 100 is located at a standby state, the dual-color lamp 62 is red, and when the smart adapter 100 is connected with the external internet-enabled device 200 by virtue of the wireless fidelity (Wi-Fi) technology, the dual-color lamp 62 is blue. In a process of connecting the smart adapter 100 with the internet-enabled device 200, confirm the smart adapter 100 and the internet-enabled device 200 are connected in a same local area network, and the dual-color lamp 62 fast blinks.

The central processing unit 7 is connected with the power supply unit 21, the voltage monitoring unit 3, the at least one display unit 5 and the cloud unit 6. The central processing unit 7 and the at least one display unit 5 proceed with a data transmission to control a display content of the at least one display unit 5 which is the at least one seven-segment displayer, and the central processing unit 7 and the cloud unit 6 proceed with a data transmission through the conversion circuit 61 to make the external internet-enabled device 200 control the main control unit 10 and the output status of the at least one socket 41. Specifically, the central processing unit 7 is used to control all functions of the smart adapter 100. For example, the central processing unit 7 controls displaying functions of the at least one display unit 5, and the at least one display unit 5 displays accumulative power (W), accumulative Kilowatt Hours (kWhs) or accumulative usage time (HRS). In another condition, the at least one display unit 5 displays instant power (W), the accumulative power (W) or the accumulative usage time (HRS). The displaying functions of the at least one display unit 5 which is the at least one seven-segment displayer are switched by virtue of pressing the at least one button 63 for a shorter time and pressing different times of the at least one button 63. A power-on function, a power-off function and a pairing function of the smart adapter 100 are realized by virtue of pressing the at least one button 63 for a longer time. Different functions of the smart adapter 100 are realized by virtue of pressing the at least one button 63 in different ways.

The central processing unit 7 controls the smart adapter 100 to be connected to or disconnected from a mobile phone (not shown), and the central processing unit 7 controls signals transmitted from the mobile phone to the cloud unit 6, etc. The central processing unit 7 receives the 5V direct-current voltage electricity from the power supply unit 21 and is monitored by the voltage monitoring unit 3. The central processing unit 7 is another micro-controller. The smart adapter 100 further includes a plurality of indicator lamps 71. Each indicator lamp 71 is the light-emitting diode (LED). The central processing unit 7 is connected with the plurality of the indicator lamps 71 for being cooperated with the signals provided by the central processing unit 7 to emit light. When the at least one display unit 5 displays the instant power (W), the accumulative power (W), the accumulative Kilowatt Hours (kWhs) or the accumulative usage time (HRS), one indicator lamp 71 lights.

Figure 5:
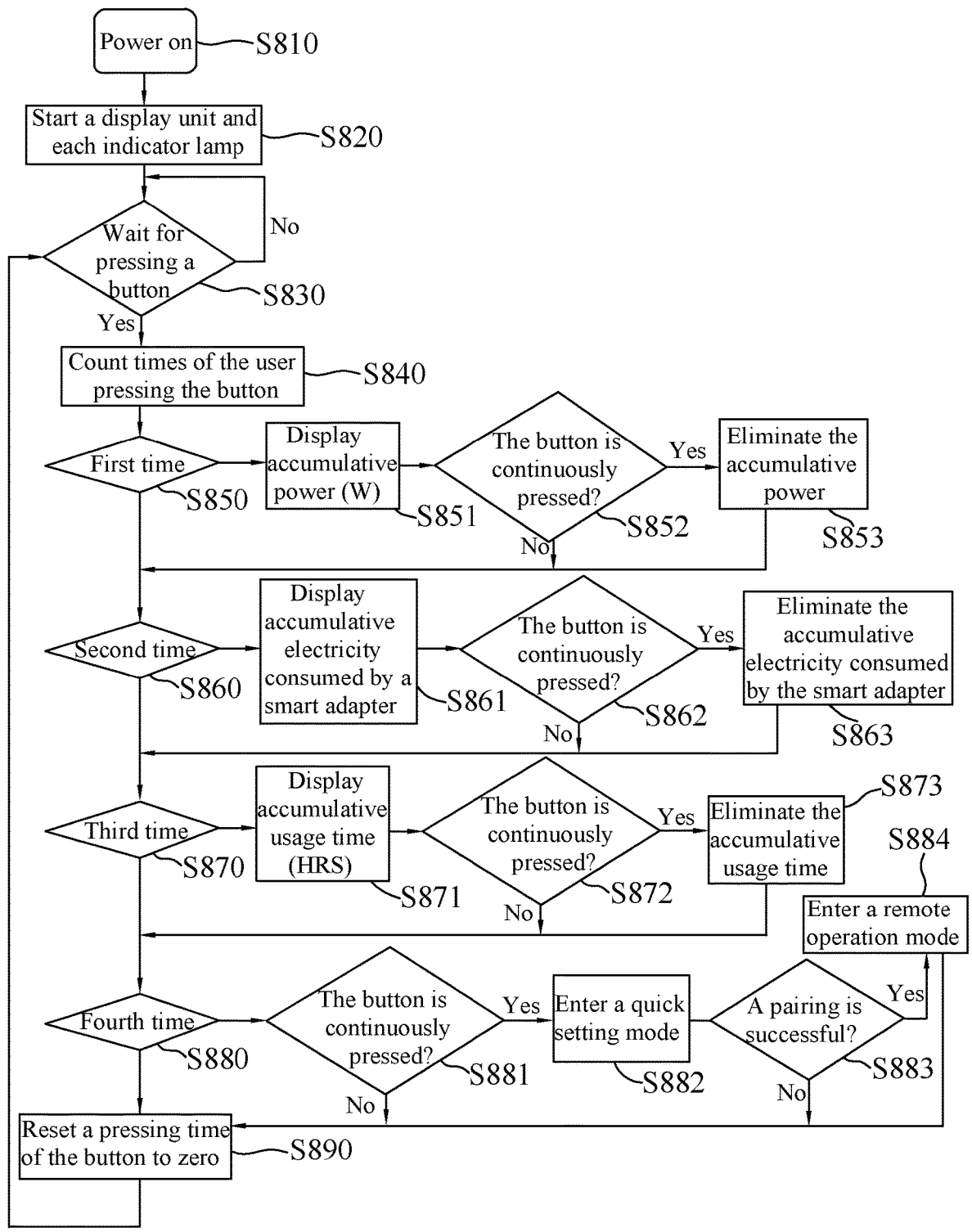
FIG. 5 is a flow chart of an operation method of the smart adapter in accordance with the preferred embodiment of the present invention.
Figure 6:
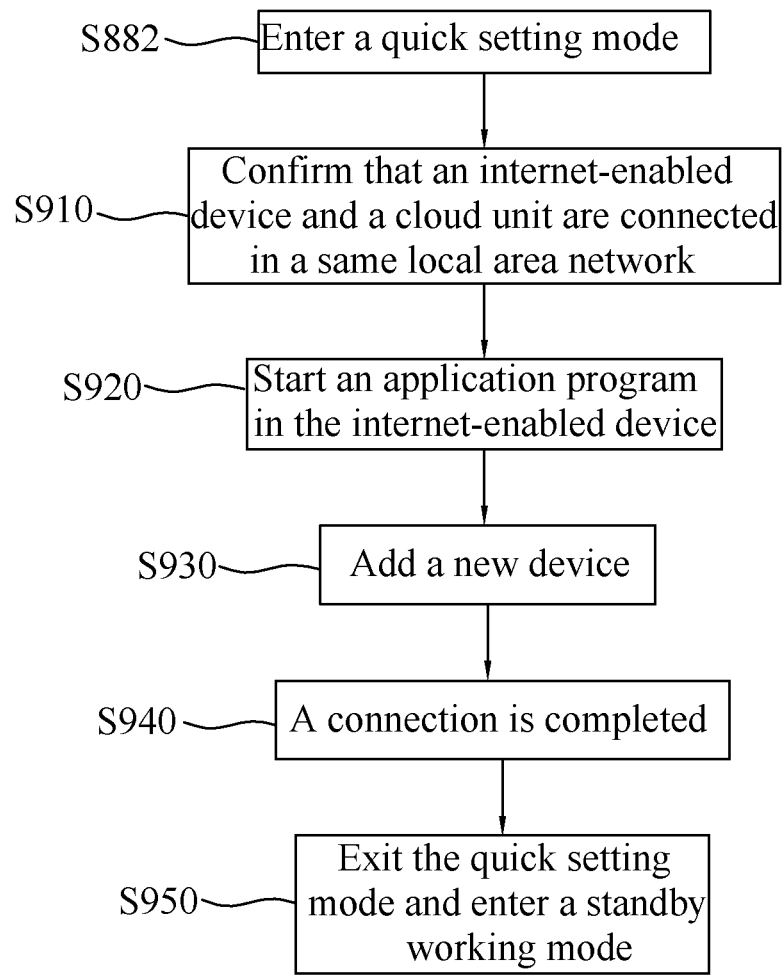
FIG. 6 is a flow chart of a network connection method of the smart adapter in accordance with the preferred embodiment of the present invention.

With reference to FIG. 1 to FIG. 6, when the smart adapter 100 is used, functions of the smart adapter 100 are started by pressing the at least one button 63. Functions set in the cloud unit 6 and the central processing unit 7 are also started by pressing the at least one button 63. An operation method of starting the functions of the smart adapter 100 includes following steps.

Step S810: power on. In this step, an external energy is introduced by virtue of the plug 2 being connected to an external power source 9, or the external energy is transmitted to various parts of the smart adapter 100 through the power supply unit 21 and the voltage monitoring unit 3.

Step S820: start the at least one display unit 5 which is the at least one seven-segment displayer, and each indicator lamp 71 of the smart adapter 100. Specifically, the four-digit number displayed on the at least one display unit 5 which is the at least one seven-segment displayer will be fully bright for one second, that is to say, 8888 will be displayed for one second. All the indicator lamps 71 keep glowing for one second.

Step S830: wait for pressing the at least one button 63. In this step, the smart adapter 100 enters the standby state, wait for a user to press the at least one button 63 for proceeding with a subsequent step.

Step S840: count times of the user pressing the at least one button 63. In this step, display a usage status or activate a network connection function of the smart adapter 100 according to the times of the user pressing the at least one button 63.

Step S850: press the at least one button 63 for a first time. When the user presses the at least one button 63 for the first time, proceed with a step S851 directly.

Step S851: display the accumulative power (W). This is to display the accumulative power used by the smart adapter 100 from a beginning of using the smart adapter 100 to current time of using the smart adapter 100. A unit of the power used by the smart adapter 100 is a wattage (W).

Step S852: determine whether the at least one button 63 is continuously pressed. In this step, determine a condition of pressing the at least one button 63 at the time of proceeding with the step S850, whether the at least one button 63 has been pressed for a longer time during a process of executing the step S850. Specifically, in this step, that the at least one button 63 is continuously pressed for more than three seconds is defined as a longer time pressing on the at least one button 63. When the at least one button 63 is determined to be without being pressed for the longer time, proceed with a step S860 of pressing the at least one button 63 for a second time. When the at least one button 63 is determined to be pressed for the longer time, execute a next step S853 of eliminating the accumulative power, the accumulative power (W) used by the smart adapter 100 is continuously displayed, and wait for the at least one button 63 to be pressed for the second time to enter the step S860.

Step S853: eliminate the accumulative power (W). In this step, reset the accumulative power (W) which is displayed to make the accumulative power which is displayed return to zero, and the accumulative power (W) is continued being displayed, and then wait for the user to press the at least one button 63 again. When the user presses the at least one button 63 again, proceed with the step S860.

Step S860: press the at least one button 63 for the second time. When the user presses the at least one button 63 for the second time, proceed with a step S861 directly.

Step S861: display the accumulative Kilowatt Hours (kWhs). Display accumulative electricity consumed by the smart adapter 100 from the beginning of using the smart adapter 100 to the current time of using the smart adapter 100.

Step S862: determine whether the at least one button 63 is continuously pressed. This step is to determine a condition of the at least one button 63 being pressed, and further determine whether the at least one button 63 has been pressed for the longer time during an execution of the step S860. Specifically, in this step, that the at least one button 63 is continuously pressed for more than three seconds is defined as the longer time pressing. When the at least one button 63 is determined to have been without being pressed for the longer time, display the accumulative electricity consumed by the smart adapter 100 continuously, and wait for pressing on the at least one button 63 for a third time to enter a step S870. When the at least one button 63 is determined to have been pressed for the longer time, execute a next step S863 of eliminating the accumulative electricity consumed by the smart adapter 100.

Step S863: eliminate the accumulative electricity consumed by the smart adapter 100. This step is to reset the accumulative electricity which is consumed by the smart adapter 100 and displayed to make the accumulative electricity which is consumed by the smart adapter 100 and displayed return to zero, and continue displaying the accumulative electricity consumed by the smart adapter 100, and then wait for the user to press the at least one button 63 again. When the at least one button 63 is pressed again by the user, proceed with the step S870.

Step S870: press the at least one button 63 for the third time. When the user presses the at least one button 63 for the third time, proceed with a step S871 directly.

Step S871: display the accumulative usage time (HRS). This step is to display the accumulative usage time used by the smart adapter 100 from the beginning of using the smart adapter 100 to the current time of using the smart adapter 100. A unit of each usage time which is displayed is an hour (hr).

Step S872: determine whether the at least one button 63 is continuously pressed. This step is to determine whether the at least one button 63 has been pressed for the longer time during an execution of the step S870. Specifically, in this step, that the at least one button 63 is continuously pressed for more than three seconds is defined as the longer time pressing. When the at least one button 63 is determined to have been without being pressed for the longer time, continue displaying the accumulative usage time, and wait for pressing the at least one button 63 for a fourth time to proceed with a step S880. When the at least one button 63 is determined to have been pressed for the longer time, execute a next step S873 of eliminating the accumulative usage time.

Step S873: eliminate the accumulative usage time. This step is to reset the accumulative usage time which is displayed to make the accumulative usage time which is displayed return to zero, and continue displaying the accumulative usage time, and then wait for the user to press the at least one button 63 again. When the user presses the at least one button 63 again, proceed with a step S880.

Step S880: press the at least one button 63 for the fourth time. When the user presses the at least one button 63 for the fourth time, proceed with a next step S881 directly.

Step S881: determine whether the at least one button 63 is continuously pressed. This step is to determine whether the at least one button 63 has been pressed for the longer time during the execution of the step S880. Specifically, in this step, that the at least one button 63 is continuously pressed for more than five seconds is defined as the longer time pressing. When the at least one button 63 is determined to have been without being pressed for the longer time, proceed with a step S890 of resetting a pressing time of the at least one button 63 to zero. When the at least one button 63 is determined to have been pressed for the longer time, proceed with a next step S882 of entering a quick setting mode.

Step S882: enter the quick setting mode. In this step, the cloud unit 6 and the internet-enabled device 200 are able to be connected to each other by virtue of a network connection method.

Step S883: determine whether a pairing is successful. This step is to determine whether the cloud unit 6 is paired with the internet-enabled device 200.

Step S884: enter a remote operation mode. In this step, the internet-enabled device 200 is able to perform a remote operation on the smart adapter 100. Then, proceed with a step S890. At this time, the smart adapter 100 is able to maintain a connection with the internet-enabled device 200 and perform other steps simultaneously.

Step S890: reset the pressing time of the at least one button 63 to zero. After finishing the step 890 of resetting the pressing time of the at least one button 63 to zero, return to wait for pressing the at least one button 63 by the user again.

With reference to FIG. 1 to FIG. 6, in the step S882, the network connection method of entering the quick setting mode between the smart adapter 100 and the internet-enabled device 200 performs following steps.

Step S910: confirm that the internet-enabled device 200 and the cloud unit 6 are connected in the same local area network. The cloud unit 6 of the smart adapter 100 and the internet-enabled device 200 need to be connected in the same local area network.

Step S920: start an application program in the internet-enabled device 200. This step is to start a pre-installed application program in the internet-enabled device 200 corresponding to the smart adapter 100.

Step S930: add a new device which is the internet-enabled device 200. In this step, pair the smart adapter 100 with the internet-enabled device 200 via the application program of the internet-enabled device 200 to make the smart adapter 100 and the internet-enabled device 200 connected to each other.

Step S940: complete the connection between the smart adapter 100 and the internet-enabled device 200. This step is to make the smart adapter 100 and the internet-enabled device 200 be in the mutual connection state.

Step S950: exit the quick setting mode and enter a standby working mode. In this step, after finishing the quick setting mode, enter the remote operation mode of the step S884 to wait for operation instructions of the internet-enabled device 200 on the smart adapter 100.

Because the smart adapter 100 mainly displays one of three statuses of the accumulative power, the accumulative electricity consumed by the smart adapter 100 or the accumulative usage time, the central processing unit 7 is connected with three indicator lamps 71, and the three indicator lamps 71 separately light to correspondingly display the accumulative power, the accumulative electricity consumed by the smart adapter 100 and the accumulative usage time. The three indicator lamps 71 are all arranged on a periphery of the at least one display unit 5, and the three indicator lamps 71 separately emit the light to be cooperated with a state currently displayed by the at least one display unit 5. The user is able to more clearly determine whether the at least one display unit 5 currently displays the accumulative power, the accumulative electricity consumed by the smart adapter 100 or the accumulative usage time. Specifically, when the at least one display unit 5 displays the accumulative power in the step S851, the indicator lamp 71 correspondingly displaying the accumulative power will light. In the step S861, when the at least one display unit 5 displays the accumulative electricity consumed by the smart adapter 100, the indicator lamp 71 correspondingly displaying the accumulative electricity consumed by the smart adapter 100 will light. When the at least one display unit 5 displays the accumulative usage time in the step S871, the indicator lamp 71 correspondingly displaying the accumulative usage time will light.

In a process of proceeding with the step S881 to determine whether the at least one button 63 is continuously pressed for five seconds, when the at least one button 63 is pressed for more than five seconds, the three indicator lamps 71 arranged around the periphery of the at least one display unit 5 will start flashing to make the smart adapter 100 start entering the quick setting mode of the step S882 for prompting the user, when the connection in the step S930 is completed, the three indicator lamps 71 arranged around the periphery of the at least one display unit 5 will all light, and the three indicator lamps 71 will be extinguished after a period of time to provide a prompt of the smart adapter 100 being successfully connected to the internet-enabled device 200 for the user, and light-emitting time will last for five seconds and then the three indicator lamps 71 are extinguished.

The dual-color lamp 62 connected to the cloud unit 6 has red and blue luminous effects to prompt the user whether the smart adapter 100 is in the connection state with the internet-enabled device 200. Specifically, when the dual-color lamp 62 emits red light, it means the smart adapter 100 and the internet-enabled device 200 are in a disconnected state. When the dual-color lamp 62 emits blue light, it means the smart adapter 100 is in the connection state with the internet-enabled device 200. Furthermore, the dual-color lamp 62 is arranged adjacent to one side of the at least one button 63.

The smart adapter 100 is able to be connected to the internet-enabled device 200 which is equipped with an Android system or an IOS system. The application program of the internet-enabled device 200 that cooperates with the smart adapter 100 has functions of displaying real-time power, displaying the usage time, displaying power dissipated in the usage time, a timing device, power on and power off statuses controlled by a far end control, a remote control, a control scheduling, a warning notification, a monthly electricity consumed status, a monthly electricity bill calculation, an equipment overload protection, sharing a control with family members, etc. The functions of the application program are without being limited to the parts disclosed above. The application program can be updated to add or adjust the functions. Therefore, the smart adapter 100 can be more compatible with the internet-enabled device 200, and the smart adapter 100 and the internet-enabled device 200 are able to have more diverse cooperations.

As described above, the smart adapter 100 is equipped with the at least one display unit 5 which is the at least one seven-segment displayer, so that the smart adapter 100 can directly display usage statuses, and the smart adapter 100 and the internet-enabled device 200 can proceed with remote controls to achieve more functions.

What is claimed is:

1. A smart adapter, comprising:
    an insulating body;
    a plug fastened to the insulating body, and the plug being partially exposed out of the insulating body, the plug including at least one pin exposed beyond a rear surface of the insulating body;
    at least one socket mounted in the insulating body and exposed to a front surface of the insulating body;
    at least one seven-segment displayer mounted in the insulating body and exposed to the insulating body;
    at least one button mounted in the insulating body and exposed to the insulating body; and
    a main control unit mounted in the insulating body and connected with the at least one socket, the plug and the at least one seven-segment displayer, the main control unit including a cloud unit and a central processing unit, the cloud unit being connected to the at least one button and the central processing unit, the cloud unit being able to be connected with an external internet-enabled device by virtue of a wireless fidelity technology to proceed with a data transmission between the cloud unit and the internet-enabled device within a wireless transmission distance, the central processing unit being connected with the at least one seven-segment displayer and the cloud unit, the central processing unit, the seven-segment displayer and the cloud unit being able to proceed with a data transmission to control a display content of the seven-segment displayer, and to communicate with and to control the external internet-enabled device so as to control the main control unit and an output status of the at least one socket.

2. The smart adapter as claimed in claim 1, wherein the main control unit includes a relay unit, power supply unit and a monitoring unit, the monitoring unit includes a voltage monitoring unit, the relay unit is connected to the power supply unit, the voltage monitoring unit and the cloud unit, the relay unit has an adjustment function of stabilizing signals among the power supply unit, the voltage monitoring unit and the cloud unit.

3. The smart adapter as claimed in claim 1, wherein the main control unit includes a relay unit and a monitoring unit, the monitoring unit includes a voltage monitoring unit and a current monitoring unit, the voltage monitoring unit is connected to the plug, the current monitoring unit, the relay unit and the central processing unit, the voltage monitoring unit and the current monitoring unit are used to stabilize states of voltage and current in the main control unit.

4. The smart adapter as claimed in claim 1, wherein displaying functions of the at least one seven-segment displayer are switched by virtue of pressing the at least one button for a shorter time and pressing different times of the at least one button.

5. The smart adapter as claimed in claim 1, wherein a power-on function, a power-off function and a pairing function of the smart adapter are realized by virtue of pressing the at least one button for a longer time.

6. The smart adapter as claimed in claim 1, wherein different functions of the smart adapter are realized by virtue of pressing the at least one button in different ways.

7. The smart adapter as claimed in claim 1, wherein the main control unit further includes a relay unit and a power supply unit, the power supply unit is connected to the plug, the relay unit and the central processing unit, and the power supply unit is used to provide electricity for the main control unit.

8. The smart adapter as claimed in claim 7, wherein the power supply unit is connected to the cloud unit by the relay unit and the current monitoring unit.

9. The smart adapter as claimed in claim 7, further comprising a low-dropout voltage regulator connected between the power supply unit and the cloud unit, the low-dropout voltage regulator providing a lower voltage for the cloud unit.

10. The smart adapter as claimed in claim 1, wherein when the smart adapter is used, the smart adapter further includes a plurality of indicator lamps, functions of the smart adapter are started by pressing the at least one button, power on, start the at least one seven-segment displayer, and each indicator lamp of the smart adapter, wait for pressing the at least one button, count times of pressing the at least one button.

11. The smart adapter as claimed in claim 10, wherein press the at least one button for a first time, display accumulative power, determine whether the at least one button is continuously pressed.

12. The smart adapter as claimed in claim 11, wherein when the at least one button is determined to be without being pressed for a longer time, proceed with a step of pressing the at least one button for a second time, when the at least one button is determined to be pressed for the longer time, execute a next step of eliminating the accumulative power, the accumulative power used by the smart adapter is continuously displayed, and wait for the at least one button to be pressed for the second time.

13. The smart adapter as claimed in claim 12, wherein display accumulative kilowatt hours, determine whether the at least one button is continuously pressed, when the at least one button is determined to have been without being pressed for the longer time, display accumulative electricity consumed by the smart adapter continuously, and wait for pressing on the at least one button for a third time, when the at least one button is determined to have been pressed for the longer time, execute a next step of eliminating the accumulative electricity consumed by the smart adapter, when the at least one button is pressed again, press the at least one button for the third time.

14. The smart adapter as claimed in claim 13, wherein display accumulative usage time, determine whether the at least one button is continuously pressed, when the at least one button is determined to have been without being pressed for the longer time, continue displaying the accumulative usage time, and wait for pressing the at least one button for a fourth time, when the at least one button is determined to have been pressed for the longer time, execute a next step of eliminating the accumulative usage time, when a user presses the at least one button again, press the at least one button for the fourth time.

15. The smart adapter as claimed in claim 14, wherein determine whether the at least one button is continuously pressed, when the at least one button is determined to have been without being pressed for the longer time, proceed with a step of resetting a pressing time of the at least one button to zero, when the at least one button is determined to have been pressed for the longer time, proceed with a next step of entering a quick setting mode, determine whether a pairing is successful, enter a remote operation mode, reset the pressing time of the at least one button to zero, after finishing the step of resetting the pressing time of the at least one button to zero, return to wait for pressing the at least one button.

16. The smart adapter as claimed in claim 15, wherein a network connection method of entering the quick setting mode between the smart adapter and the internet-enabled device performs following steps: confirm that the internet-enabled device and the cloud unit are connected in a same local area network, start an application program in the internet-enabled device, add a new device which is the internet-enabled device, complete the connection between the smart adapter and the internet-enabled device, exit the quick setting mode and enter a standby working mode.

17. A smart adapter, comprising:
an insulating body;
a plug fastened to the insulating body, the plug including at least one pin exposed beyond a rear surface of the insulating body;
at least one socket mounted in the insulating body and exposed to a front surface of the insulating body;
at least one display unit mounted in the insulating body and exposed to the insulating body;
at least one button mounted in the insulating body and exposed to the insulating body; and
a main control unit mounted in the insulating body, and connected with the at least one socket, the plug and the at least one display unit, the main control unit including a cloud unit and a central processing unit, the cloud unit being connected to the at least one button and the central processing unit, the cloud unit being able to be connected with an external internet-enabled device, the central processing unit being connected with the at least one display unit and the cloud unit, the central processing unit, the at least one display unit and the cloud unit being able to proceed with a data transmission to control a display content of the at least one display unit, and to communicate with and to control the external internet-enabled device so as to control the main control unit and an output status of each socket;
wherein different functions of the smart adapter are realized by virtue of pressing the at least one button in different ways.

18. A smart adapter adapted for being connected with an external internet-enabled device, comprising:
an insulating body;
a plug fastened to the insulating body, the plug including at least one pin exposed beyond a rear surface of the insulating body;
at least one socket mounted in the insulating body and exposed to a front surface of the insulating body;
at least one seven-segment displayer mounted in the insulating body and exposed to the insulating body;
at least one button mounted in the insulating body and exposed to the insulating body, displaying functions of the at least one seven-segment displayer being switched by virtue of pressing the at least one button for a shorter time and pressing different times of the at least one button, and a power-on function, a power-off function and a pairing function of the smart adapter being realized by virtue of pressing the at least one button for a longer time; and
a main control unit mounted in the insulating body and connected with the at least one socket, the plug and the at least one seven-segment displayer, the main control unit including a cloud unit and a central processing unit, the cloud unit being connected to the at least one button and the central processing unit, the cloud unit being able to be connected with the external internet-enabled device by virtue of a wireless fidelity technology, the central processing unit being connected with the seven-segment displayer and the cloud unit, the central processing unit, the seven-segment displayer and the cloud unit being able to proceed with a data transmission to control a display content of the seven-segment displayer, and to communicate with and to control the external internet-enabled device so as to control the main control unit and an output status of each socket.

* * * * *